(12) United States Patent
Eddington, Jr.

(10) Patent No.: US 10,204,638 B2
(45) Date of Patent: Feb. 12, 2019

(54) INTEGRATED SENSOR-ARRAY PROCESSOR

(71) Applicant: Ronald C. Eddington, Jr., Los Gatos, CA (US)

(72) Inventor: Ronald C. Eddington, Jr., Los Gatos, CA (US)

(73) Assignee: AAWARE, Inc., Los Gatos, CA (US)

( * ) Notice: Subject to any disclaimer, the term of this patent is extended or adjusted under 35 U.S.C. 154(b) by 0 days.

(21) Appl. No.: 16/055,370

(22) Filed: Aug. 6, 2018

(65) Prior Publication Data

US 2018/0342259 A1 Nov. 29, 2018

Related U.S. Application Data

(63) Continuation-in-part of application No. 15/647,863, filed on Jul. 12, 2017, now Pat. No. 10,049,685, (Continued)

(51) Int. Cl.
  *G06F 3/16* (2006.01)
  *G10L 21/0224* (2013.01)
  (Continued)

(52) U.S. Cl.
  CPC .......... *G10L 21/0224* (2013.01); *G10L 15/20* (2013.01); *G10L 19/022* (2013.01);
  (Continued)

(58) Field of Classification Search
  None
  See application file for complete search history.

(56) References Cited

U.S. PATENT DOCUMENTS

| | | |
|---|---|---|
| 4,311,874 A | 1/1982 | Wallace, Jr. |
| 5,353,376 A | 10/1994 | Oh et al. |

(Continued)

FOREIGN PATENT DOCUMENTS

| | | |
|---|---|---|
| EP | 0140249 A1 | 5/1985 |
| WO | WO200106493 A1 | 1/2001 |
| WO | WO2006121896 A2 | 11/2006 |

OTHER PUBLICATIONS

Doclo, Simon et al.; Efficient Frequency-Domain Implementation of Speech Distortion Weighted Multi-Channel Wiener Filtering for Noise Reduction; EUSIPCO; 2004; pp. 2007-2010; Katholicke Universiteit Leuven, Dept. of Electrical Engineering: Lenven, Belgium.

(Continued)

*Primary Examiner* — Marcus T Riley
(74) *Attorney, Agent, or Firm* — Davis, Malm & D'Agostine, P.C.; Richard L. Sampson

(57) ABSTRACT

An integrated sensor-array processor and method includes sensor array time-domain input ports to receive sensor signals from time-domain sensors. A sensor transform engine (STE) creates sensor transform data from the sensor signals and applies sensor calibration adjustments. Transducer time-domain input ports receive time-domain transducer signals, and a transducer output transform engine (TTE) generates transducer output transform data from the transducer signals. A spatial filter engine (SFE) applies suppression coefficients to the sensor transform data, to suppress target signals received from noise locations and/or amplification locations. A blocking filter engine (BFE) applies subtraction coefficients to the sensor transform data, to subtract the target signals from the sensor transform data. A noise reduction filter engine (NRE) subtracts noise signals from the BFE output. An inverse transform engine (ITE) generates time-domain data from the NRE output.

42 Claims, 15 Drawing Sheets

Related U.S. Application Data which is a continuation-in-part of application No. 15/166,842, filed on May 27, 216, now Pat. No. 9,721,583, which is a continuation of application No. 14/205,691, filed on Mar. 12, 2014, now Pat. No. 9,443,529.

(60) Provisional application No. 61/777,624, filed on Mar. 12, 2013.

(51) Int. Cl.
*G10L 19/26* (2013.01)
*G10L 19/022* (2013.01)
*G10L 19/02* (2013.01)
*G10L 15/20* (2006.01)
G10L 21/0208 (2013.01)
G10L 21/0216 (2013.01)

(52) U.S. Cl.
CPC .......... *G10L 19/0212* (2013.01); *G10L 19/26* (2013.01); *G10L 21/0208* (2013.01); G10L 2021/02082 (2013.01); G10L 2021/02166 (2013.01)

(56) References Cited

U.S. PATENT DOCUMENTS

| | | | |
|---|---|---|---|
| 6,640,145 B2* | 10/2003 | Hoffberg | G05B 19/0426 700/17 |
| 6,850,887 B2 | 2/2005 | Epstein et al. | |
| 6,868,045 B1 | 3/2005 | Schroder | |
| 7,006,881 B1* | 2/2006 | Hoffberg | G05B 15/02 700/17 |
| 7,076,315 B1 | 7/2006 | Watts | |
| 7,106,233 B2* | 9/2006 | Schroeder | G01R 33/07 324/71.3 |
| 7,349,849 B2 | 3/2008 | Silverman et al. | |
| 8,694,306 B1* | 4/2014 | Short | G10L 21/0272 381/10 |
| 2005/0047611 A1 | 3/2005 | Mao | |
| 2005/0195988 A1 | 9/2005 | Tashev et al. | |
| 2007/0263849 A1 | 11/2007 | Stokes et al. | |
| 2009/0323982 A1 | 12/2009 | Solback et al. | |
| 2010/0145657 A1* | 6/2010 | Kavusi | G01D 18/008 702/189 |
| 2011/0222372 A1 | 9/2011 | O'Donovan et al. | |
| 2011/0274289 A1 | 11/2011 | Tashev et al. | |
| 2012/0082322 A1 | 4/2012 | Van Waterschool et al. | |
| 2014/0003611 A1* | 1/2014 | Mohammad | H04R 3/005 381/66 |
| 2014/0278445 A1* | 9/2014 | Eddington, Jr. | G10L 21/0208 704/275 |
| 2017/0309292 A1* | 10/2017 | Eddington, Jr. | G10L 21/0224 |

OTHER PUBLICATIONS

Zheng, Yahong Rosa and Goubran, Rafik A.: Robust Near-Field Adaptive Beamformingn with Distance Discrimination; IEEE Transactions on Speech and Audio Processing; vol. 12, No. 5, Sep. 2004; pp. 478-488.

Tashev, Ivan and Acero, Alex; Microphone Array Post-Processor Using Instantaneous Direction of Arrival; IWAENC 2006; Paris; Sep. 12-14; 2006; 4 pages.

Yoon et al.; Robust Adaptive Beamforming Algorithm Using Instantaneous Direction of Arrival with Enhanced Noise Suppression Capability; IEEE 2007; ICASSP 2007; pp. I-133 to I-136.

Madhu, Nilesh and Martin, Rainer; Score: A Low Complexity, Robust Algorithm for the Detection of Corrupt Sensors and Self-Calibration of Microphone Arrays; Institute of Communication Acoustics; Bochum, Germany; 4 pages.

Iqbal, Mohhamad Asif et al.; A Frequency Domain Doubletalk Detector Based on Cross-Correlation and Extension to Multi-Chennel Case; IEEE 2009; Asilomar 2009; pp. 638-641.

Reindl, Klaus et al.: An Acoustic Front-End for Interactive TV Incorporating Multichannel Acoustic Echo Cancellation and Blind Signal Extraction; IEEE 2010; Asilomar 2010; Multimedia Communications and Signal Processing; University of Erlangen-Nurenburg; Erlangen, Germany; pp. 1716-1720.

Wolff, Tobias et al.; A generalized view on microphone array postfilters; Nuance Communications Aachen GmbH; Ulm, Germany; Acoustic Signal Processing Research; 4 pgs.

Buchner, Herbert et al.; TRINICON for Dereverberation of Speech and Audio Signals; Multimedia Communications and Signal Processing; University of Erlangen-Hurenberg; Erlangen, Germany; pp. 1-79.

Madhu, Nilesh et al.; A Versatile Framework for Speaker Separation Using a Model-Based Speaker Localization Approach; IEEE Transactions on Audio, Speech and Language Processing; vol. 19, No. 7; Sep. 2011; pp. 1900-1912.

Osterwise, Christopher et al.; A Comparison of BSS Algorithms in Harsh Environments; Dept. of Electrical & Computer Engineering; Missouri University of Science & Technology; Rolla, MO; 6 pages.

Ozerov, Alexey et al.; A General Flexible Framework for the Handling of Prior Information in Audio Source Separation; IEEE Transactions on Audio, Speech and Language Processing; hal-00626962, version 2, Jun. 22, 2012; pp. 1-16.

Mohammad, Asif Lqbal et al.; Cross-Correlation Based Echo Canceller Controllers; Patentdocs; http://www.faqs.org/patents/app/20080240413; May 2, 2012; pp. 1-17.

* cited by examiner

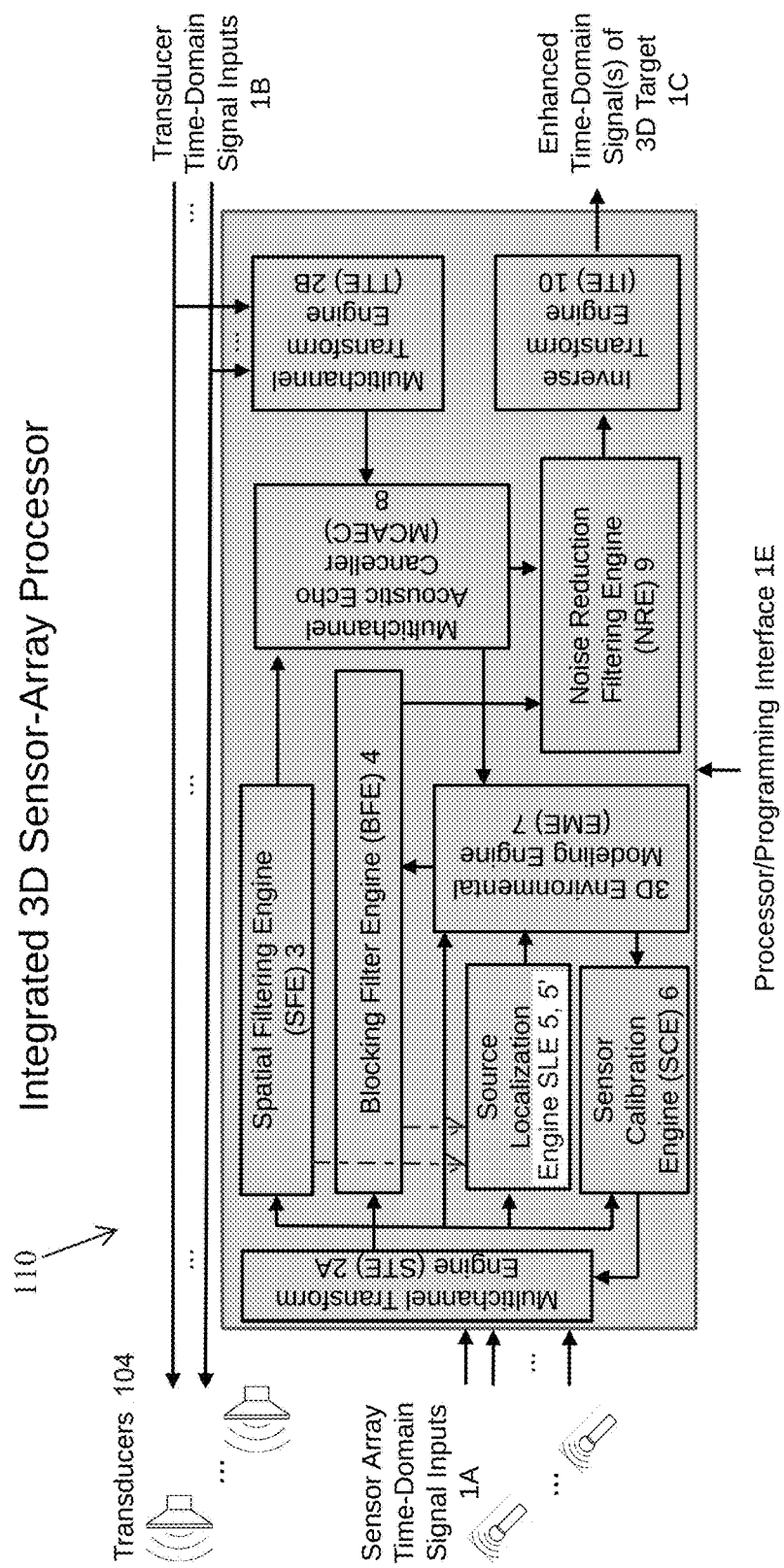

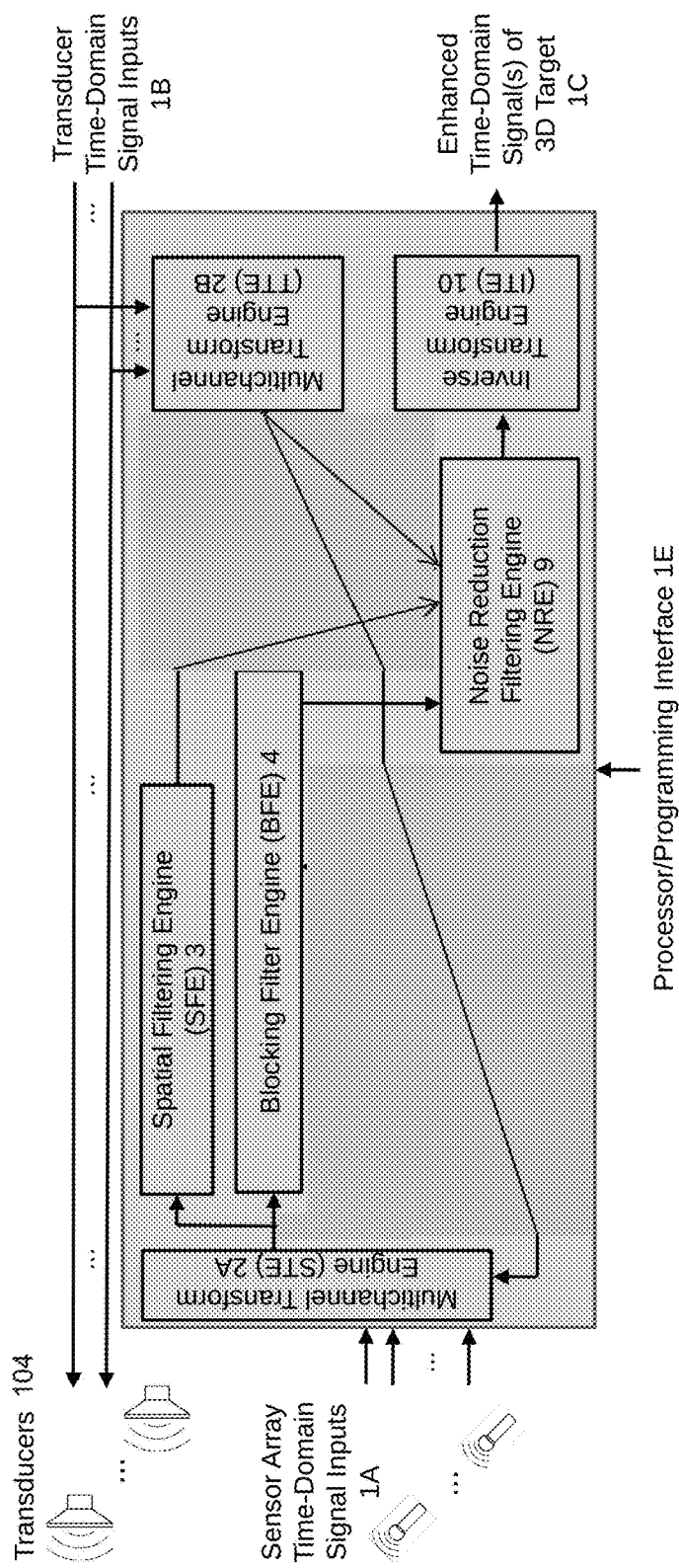

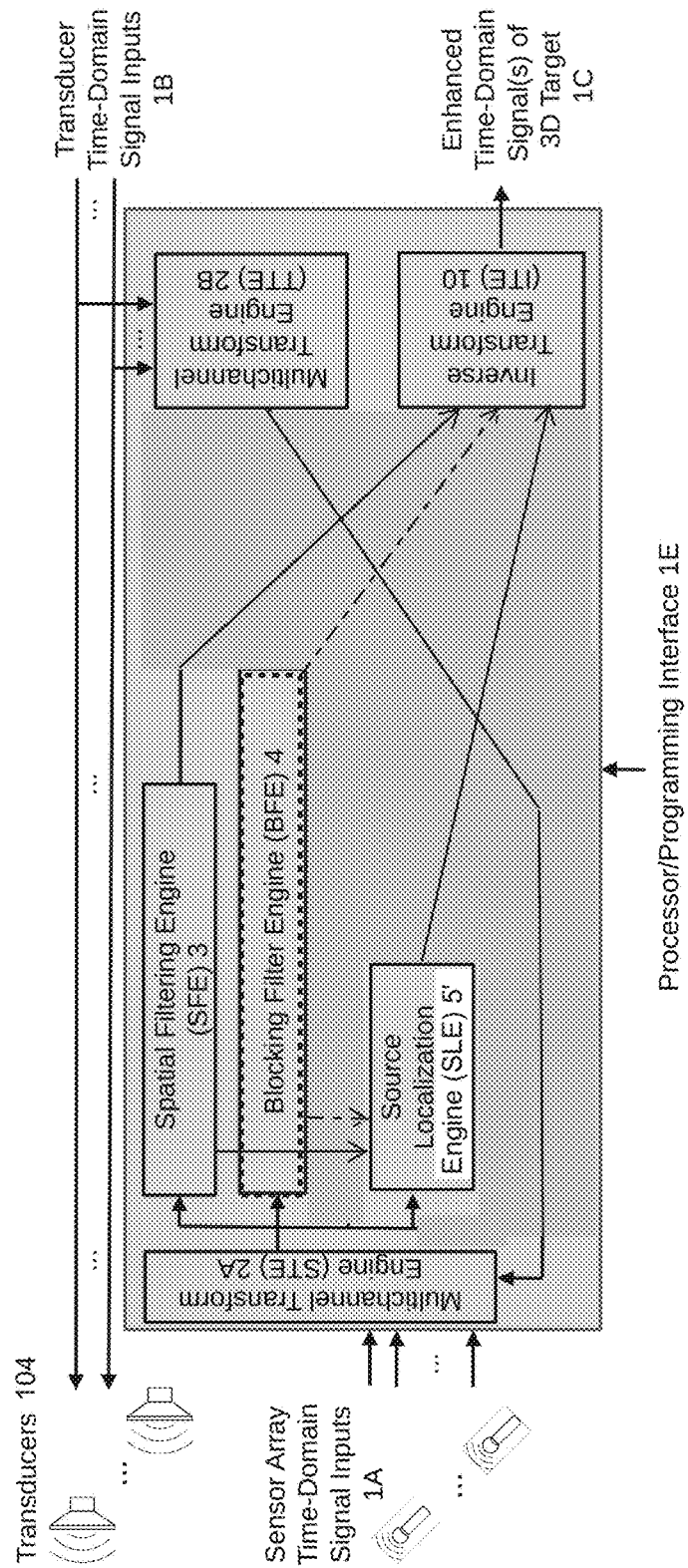

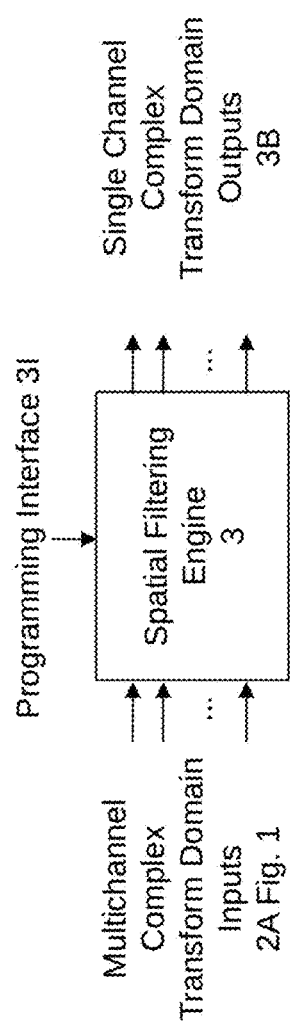

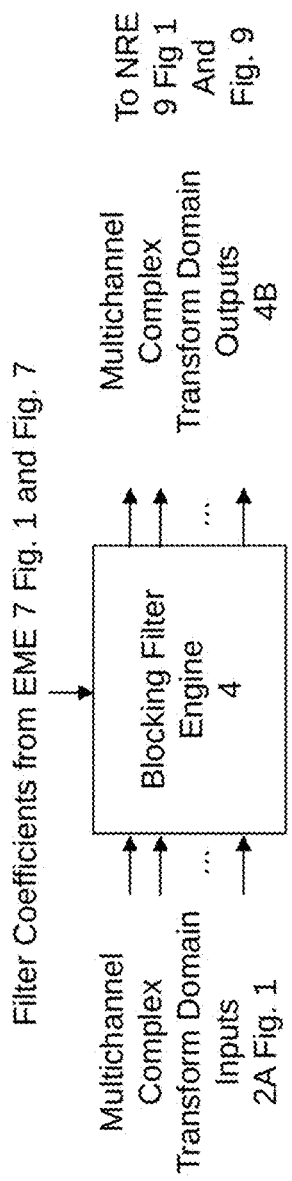

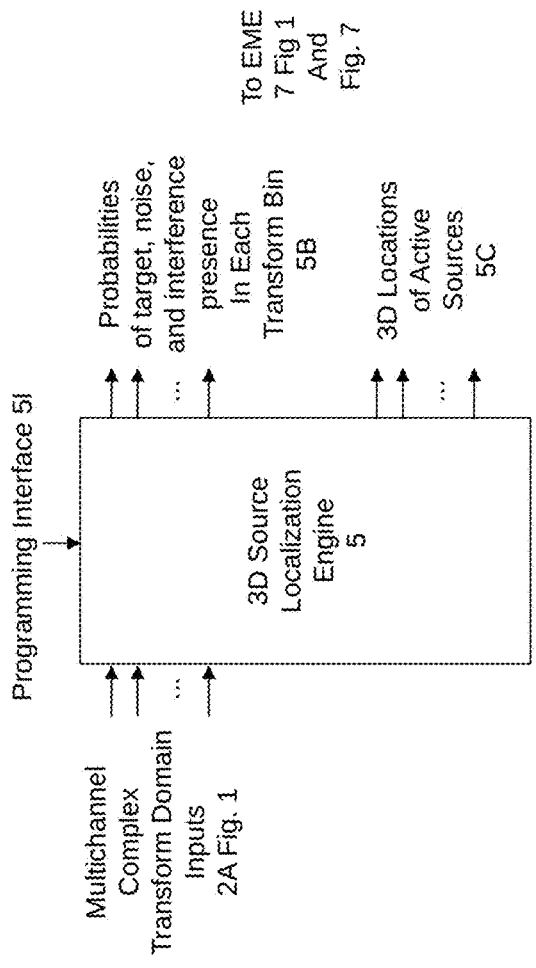

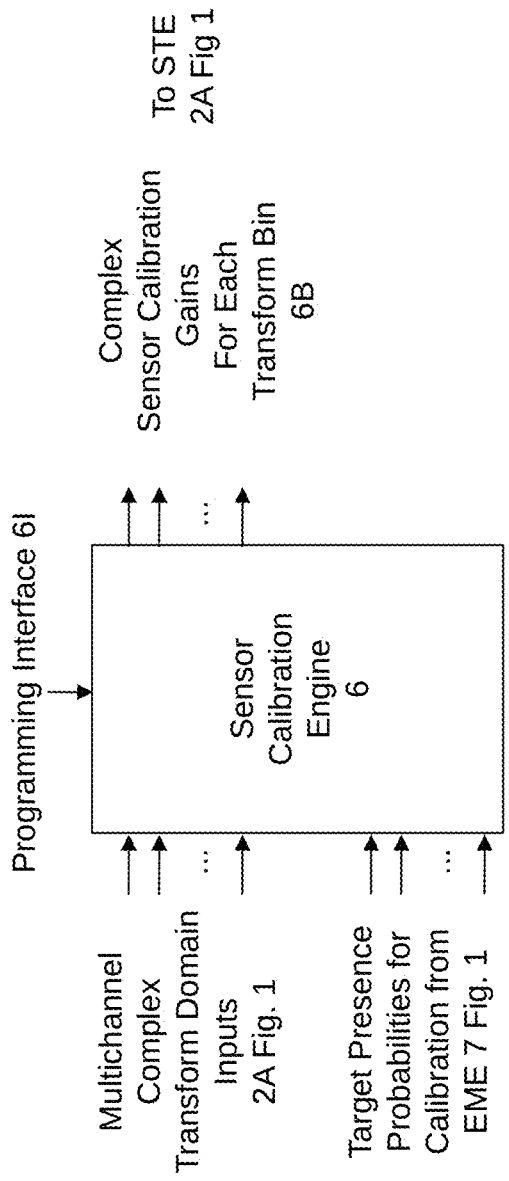

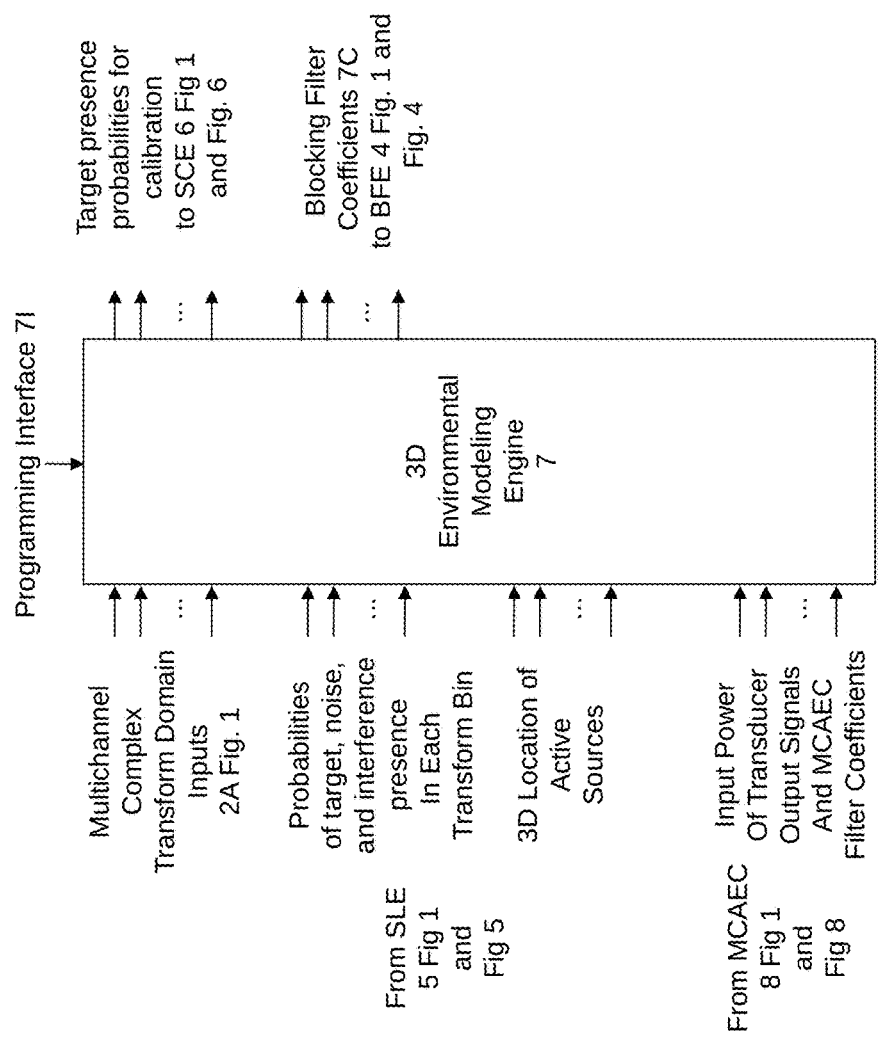

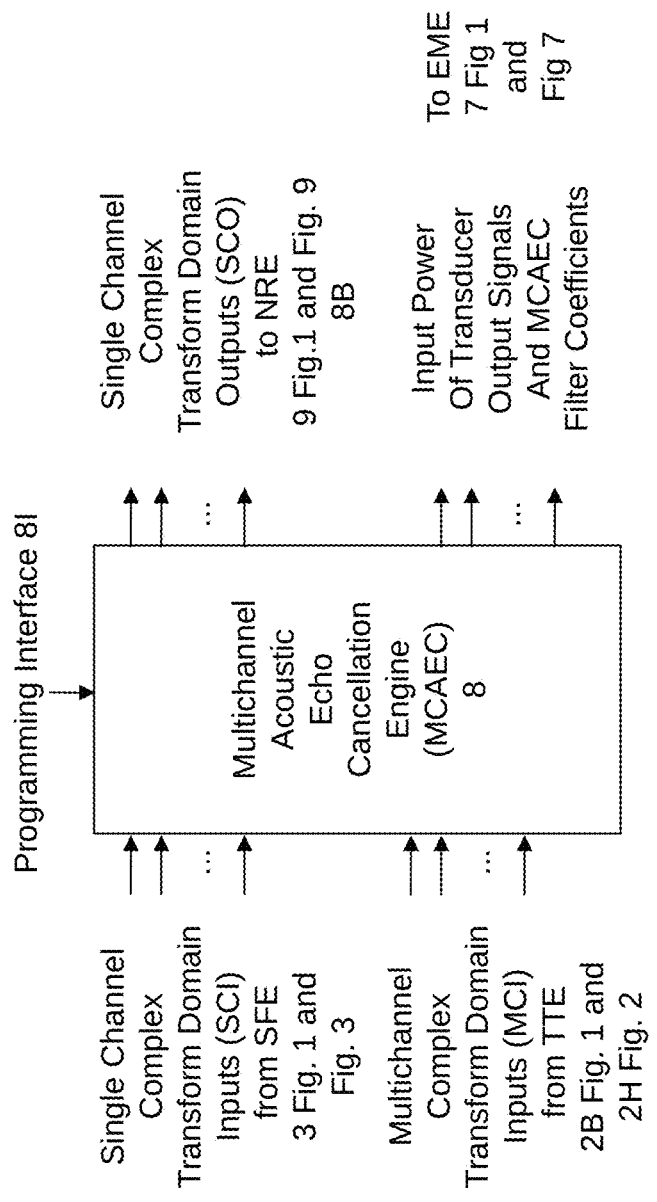

INTEGRATED SENSOR-ARRAY PROCESSOR

RELATED APPLICATIONS

This application is a Continuation-In-Part of co-pending U.S. patent application Ser. No. 15/647,863, entitled Integrated Sensor-Array Processor, filed on Jul. 12, 2017, which is a Continuation-In-Part of U.S. patent application Ser. No. 15/166,842 (now U.S. Pat. No. 9,721,583), entitled Integrated Sensor-Array Processor, filed on May 27, 2016, which is a Continuation of U.S. patent application Ser. No. 14/205,691 (now U.S. Pat. No. 9,443,529), entitled Integrated Sensor-Array Processor, filed on Mar. 12, 2014, which claims the benefit of U.S. Provisional Patent Application Ser. No. 61/777,624, entitled Speech Recognition, filed on Mar. 12, 2013, the contents all of which are incorporated herein by reference in their entirety for all purposes.

BACKGROUND

Technical Field

This invention relates to speech recognition, and more particularly to an integrated sensor-array processor and method for use in various speech-enabled applications.

Background Information

Throughout this application, various publications, patents and published patent applications are referred to by an identifying citation. The disclosures of the publications, patents and published patent applications referenced in this application are hereby incorporated by reference into the present disclosure.

Sensor reception of signals originating in a 3D environment are often corrupted by noise and interference. For example, a microphone that acquires speech audio from a human speaker in a noisy room will contain noise and interference. The noise and interference often limits the usability of the audio signal for many applications such as automatic speech recognition (ASR). For example, it is well known that ASR success rates are very low (<20%) for voices that are distant from microphone (>1 m), in rooms with high reverberation. The performance is worse when interference from other locations is simultaneously adding to the microphone sensor input signals. Such interference can be generated by air conditioning vents on the floor or ceiling, a fireplace fan, a set of surround speakers with music or speech playback signals, or even other human speakers talking simultaneously. This problem also occurs in other domains such as sonar, radar, and ultrasonic sensing.

Using an array of sensors may improve the reception when the sensor signals are filtered using a weighted sum, e.g., using weights (or coefficients) designed to amplify the target signal by weighting time delay differences of the signal arrival. Because the sensor locations are spatially separated, the time-delays can be used to separate and either amplify or reduce signals coming from different directions. An ideal filter may be able to amplify signals coming from a target location, and completely reject interference signals coming from other locations. However, those skilled in the art will recognize that ideal filters can never be realized in practice due to fundamental signal processing and physics principles that limit the ability to completely separate signals in space or time.

Methods to improve sensor array filters include using transformations (transforms) that convert time-domain signals into frequency domain and allow specific filters for each frequency component of the sensor input signals. A frequency domain sensor array filter will have a set of sensor weights (coefficients) for each frequency bin of the transform. This isolates signal behavior and provides the ability to individually apply and tune the filtering and other processing to the signal energy in that specific frequency. This is known to significantly improve filtering performance and other types of processing too. However, the complexity and computational cost of frequency domain processing can be significantly higher than processing in the time domain. In particular, the additional latency of frequency domain processing versus time-domain processing is significant. For example, the Fourier Transform, and one of its embodiments, the Fast Fourier Transform (FFT) can add more than 2N samples of latency, where N is the block of time-samples the FFT transforms into complex frequency data values (complex referring to the real and imaginary component) and the Inverse FFT requires another N samples to convert back into the time-domain. In contrast, a time-domain filter can be as low as 0 or 1 sample (but with lower filtering performance).

Latency can be reduced by taking the FFT at a faster frame rate, allowing overlap of the signals in the blocks. For example, taking an FFT every N/4 samples would have 25% new samples and 75% older samples in its transform result. This can lower latency to 2*N/4, but now the computation cost has increased 4×. Furthermore, other processing that may be used to improve filtering, such as adaptive filtering, multichannel acoustic echo cancellation, and source localization, would all have to operate at this higher rate.

The FFT example also illustrates a problem with uniform frequency spacing in that every transform has N bins, meaning the frequency resolution is the input sample rate/N. For many applications that require high resolution in some frequencies (i.e. 1024 to 16K), a particularly large computation cost is incurred when oversampling frame rates.

Accordingly, it would be advantageous to use more efficient and flexible transforms that allow non-uniform frequency spacing and frame rates across the frequency bins (referred to hereinbelow as "transform bins"). Furthermore, it would be advantageous to use a transform approach that reduces the computation cost of implementation in FPGA hardware, ASIC hardware, embedded DSP firmware, and/or in software and when higher frame rates and non-uniform frequency spacings are used. This may enable flexibility to tune the resolution using higher or lower frequency spacings where needed. This may also lead to a sensor array processing solution with relatively low latency while maintaining advantages of transform domain processing. Resulting transform-domain processing efficiency improvements may enable other processing to be integrated more closely with the filtering to enhance performance while maintaining relatively low system latency.

SUMMARY

In one aspect of the present invention, an integrated sensor-array processor includes sensor array time-domain input ports configured to receive sensor signals from time-domain sensors.

A sensor transform engine (STE) is configured to create sensor transform data from the sensor signals and to apply sensor calibration adjustments. Transducer time-domain input ports receive time-domain transducer signals, and a transducer output transform engine (TTE) is configured to generate transducer output transform data from the transducer signals. A spatial filter engine (SFE) applies suppression coefficients to the sensor transform data, to suppress target signals received from noise locations and/or amplification locations. A blocking filter engine (BFE) is configured to apply subtraction coefficients to the sensor transform data, to subtract the target signals from the sensor transform data. A noise reduction filter engine (NRE) is configured to subtract noise signals from the BFE output. An inverse transform engine (ITE) is configured to generate time-domain data from the NRE output, which is then sent to output ports.

In another aspect of the invention, an integrated sensor-array processor includes sensor array time-domain input ports configured to receive sensor signals from time-domain sensors, and a sensor transform engine (STE) configured to create sensor transform data from the sensor signals and to apply sensor calibration adjustments. Transducer time-domain input ports are configured to receive time-domain transducer signals, and a transducer output (TTE) transform engine generates transducer output transform data from the transducer signals. A spatial filter engine (SFE) applies suppression coefficients to the sensor transform data, to suppress target signals received from noise locations and/or amplification locations. A source localization engine (SLE) estimates active source locations in a 3D sensor field of each subband in each frame of the sensor transform data outputted by the STE. A blocking filter engine (BFE) applies subtraction coefficients to the sensor transform data, to subtract the target signals from the sensor transform data. A multichannel acoustic-echo cancellation engine (MEAEC) subtracts transducer signals from SFE output and the TTE output. An environmental modeling engine (EME) is configured to process SLE outputs and MCAEC outputs to characterize active sources as transducer or non-transducer, to calculate enclosure characteristics, to calculate BFE coefficients, and to calculate SCE values. A sensor calibration engine (SCE) is configured to use the sensor transform data to calculate sensor calibration values for sensor frequency bins operating on SLE and MCAEC outputs. A noise reduction filter engine (NRE) subtracts noise signals from the BFE output. An inverse transform engine (ITE) generates time-domain data from the NRE output which is sent to output ports.

In still another aspect of the invention, a method of integrated sensor-array processing includes creating, at a sensor transform engine (STE), sensor transform data from time-domain sensor signals and applying sensor calibration adjustments. A transducer output transform engine (TTE) generates transducer output transform data from transducer signals. The method also includes applying, at a spatial filter engine (SFE), one or more sets of suppression coefficients to the sensor transform data, to suppress target signals received from noise locations and/or amplification locations. A blocking filter engine (BFE) applies one or more sets of subtraction coefficients to the sensor transform data, to subtract the target signals from the sensor transform data. Noise signals from the BFE output are subtracted, using a noise reduction filter engine (NRE). Time-domain data is generated from the NRE output at an inverse transform engine (ITE), and then outputted at one or more output ports.

In yet another aspect of the invention, an article of manufacture includes a non-transitory computer usable medium having a computer readable program code embodied therein for performing the preceding method.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The present invention is illustrated by way of example and not limitation in the figures of the accompanying drawings, in which like references indicate similar elements and in which:

FIG. 1B is a functional block diagram of an embodiment of the present invention with optional aspects shown in phantom;

FIG. 1C is a functional block diagram of an alternate embodiment of the present invention;

FIG. 1D is a functional block diagram of another alternate embodiment of the present invention with optional aspects shown in phantom;

FIG. 3 is a functional block diagram of a component used in embodiments of the present invention;

FIG. 4 is a functional block diagram of a component used in embodiments of the present invention;

FIG. 5A is a functional block diagram of a component used in embodiments of the present invention;

FIG. 6 is a functional block diagram of a component used in embodiments of the present invention;

FIG. 7 is a functional block diagram of a component used in embodiments of the present invention;

FIG. 8 is a functional block diagram of a component used in embodiments of the present invention;

DETAILED DESCRIPTION

Figure 1A:
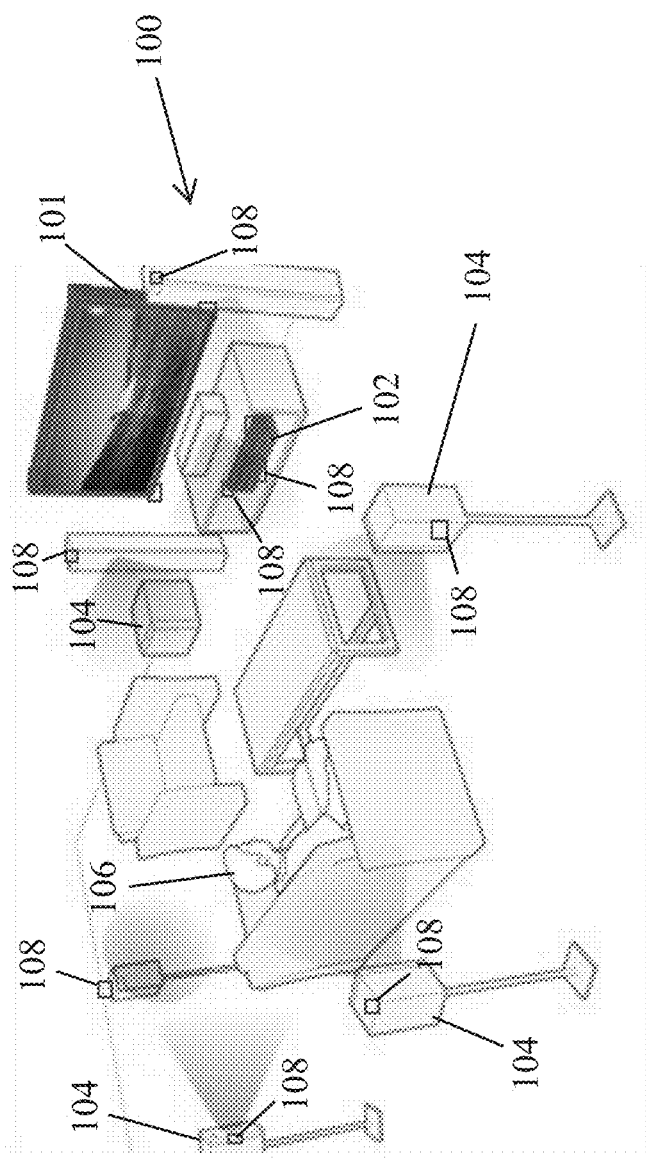
FIG. 1A is a schematic, perspective view of an exemplary application in which embodiments of the present invention may be incorporated.

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. In addition, well-known structures, circuits and techniques have not been shown in detail in order not to obscure the understanding of this description. The following detailed description is, therefore, not to be taken in a limiting sense, and the scope of the present invention is defined by the appended claims and their equivalents.

As used in the specification and in the appended claims, the singular forms "a", "an", and "the" include plural referents unless the context clearly indicates otherwise. For example, reference to "an analyzer" includes a plurality of such analyzers. In another example, reference to "an analysis" includes a plurality of such analyses.

Although specific terms are employed herein, they are used in a generic and descriptive sense only and not for purposes of limitation. All terms, including technical and scientific terms, as used herein, have the same meaning as commonly understood by one of ordinary skill in the art to which this invention belongs unless a term has been otherwise defined. It will be further understood that terms, such as those defined in commonly used dictionaries, should be interpreted as having a meaning as commonly understood by a person having ordinary skill in the art to which this invention belongs. It will be further understood that terms, such as those defined in commonly used dictionaries, should be interpreted as having a meaning that is consistent with their meaning in the context of the relevant art and the present disclosure. Such commonly used terms will not be interpreted in an idealized or overly formal sense unless the disclosure herein expressly so defines otherwise.

Briefly described, embodiments of the present invention include a sensor-array processor apparatus and method for voice-recognition in speech recognition and teleconferencing applications, such as Speech-Enabled Home Theater, Smart Televisions, Digital Video Recorders, etc. Particular examples are embodied in various hardware devices, such as programmed FPGAs (Field Programmable Gate Arrays), ASICs (Application-Specific Integrated Circuits), GPUs (Graphics Processing Units) and/or DSPs (Digital Signal Processors), including software to program these devices.

These embodiments enable high performance integration of key functions required to enhance signals originating in the 3D environment where the sensors are located. Efficiently integrated functions include multiple stages of multichannel spatial filtering (SF), multichannel acoustic echo cancellation (MCAEC), source localization (SL), sensor calibration (SC), and inverse transform (IT). Embodiments using the described methods may achieve low latency processing and optimized tradeoffs of implementation cost versus signal enhancement performance.

In the following description, for purposes of explanation, numerous specific details are set forth in order to provide a thorough understanding of the present invention. It will be evident, however, to one skilled in the art that the present invention may be practiced without these specific details.

For the purposes of the present specification, the term "computer" is meant to encompass a workstation, personal computer, personal digital assistant (PDA), wireless telephone, or any other suitable computing device including a processor, a computer readable medium upon which computer readable program code (including instructions and/or data) may be disposed, and a user interface. Terms such as "server", "application", "engine" and the like are intended to refer to a computer-related component, including hardware, software, and/or software in execution. For example, an engine may be, but is not limited to being, a process running on a processor, a processor including an object, an executable, a thread of execution, a program, and a computer. Moreover, the various components may be localized on one device and/or distributed between two or more devices.

The system and method embodying the present invention can be programmed in any suitable language and technology, such as, but not limited to: C++; Visual Basic; Java; VBScript; Jscript; BCMAscript; DHTM1; XML and CGI. Alternative versions may be developed using other programming languages including, Hypertext Markup Language (HTML), Active ServerPages (ASP) and Javascript. Any suitable database technology can be employed, such as, but not limited to, Microsoft SQL Server or IBM AS 400.

Referring now to the Figures, embodiments of the present invention will be more thoroughly described. As shown in FIG. 1A, embodiments of the present invention include a 3D Sensor Array Processor 110 (FIGS. 1B, 1C) incorporated within a home theater system 100. For example, processor 110 may be operatively engaged with an otherwise conventional home theater receiver 102. System 100 also includes an array of conventional audio speakers 104 communicably coupled to the receiver 102. An array of microphones or other sensors 108, may be integrated into a device or system, such as a home theater system 100, set top box, television display 101, and/or spaced among the speakers 104, such as at each speaker 104, and are communicably coupled to the processor 110. The system 100, including the processor 110, enables a user 106 to actuate various theater functions simply by speech.

Turning now to FIG. 1B, in a representative embodiment, 3D Sensor Array Processor (3DSAP) 110 includes inputs 1A, which are configured to receive digital signals from the sensor array and delivers an enhanced output signal 1C focused on a target signal (e.g., the voice of user 106) located in the 3-dimensional space around the sensors locations. The signal enhancements provided by the processor 110 include removal of background noise, cancellation of transducer playback signals, and filtering to remove interference signals originating from 3D locations away from the target signal. The 3DSAP 110 also inputs multichannel transducer playback signals for use in cancelling their direct reception at the sensors and also their echo/reflections as they reverberate throughout an enclosure and arrive at the sensors.

In the exemplary application shown in FIG. 1A, 3DSAP 110 receives signals from the microphone 108 array at inputs 1A, and provides an enhanced transducer signal at output 1C to receiver 102 of the surround-sound speaker system. The 3DSAP 110 can enhance the speech signal of a talker 106 in a living room by removing audio speaker signals, reverberation, background noise, and other interference coming from most 3D locations that are spatially separate from the talker. In this scenario, the 3DSAP 110 can enable automatic speech recognition (ASR) to work more effectively for voice control of distant devices such as TVs, set top boxes, and home theater systems.

In the representative embodiment of FIG. 1B, 3DSAP 110 includes a plurality of sensor array time-domain input ports 1A configured to receive sensor signals from a plurality of time-domain sensors. A sensor transform engine (STE) 2A is configured to create sensor transform data from said sensor signals and to apply sensor calibration adjustments. A plurality of transducer time-domain input ports 1B are configured to receive a plurality of time-domain transducer signals. A transducer output transform engine (TTE) 2B is configured to generate transducer output transform data from the transducer signals. A spatial filter engine (SFE) 3 is configured to apply one or more sets of suppression coefficients to the sensor transform data, to suppress target signals received from noise locations and/or amplification locations. A source localization engine (SLE) 5 is configured to estimate active source locations in a 3D sensor field of each subband in each frame of the sensor transform data outputted by the STE. A blocking filter engine (BFE) 4 is configured to apply one or more sets of subtraction coefficients to the sensor transform data, to subtract the target signals from the sensor transform data. A multichannel acoustic-echo cancellation engine (MEAEC) 8 is configured to subtract transducer signals from SFE output and the TTE output. An environmental modeling engine (EME) 7 is configured to process SLE outputs and MCAEC outputs to characterize active sources as transducer or non-transducer, calculate enclosure characteristics, calculate BFE coefficients, and SCE values. A sensor calibration engine (SCE) 6 is configured to use the sensor transform data to calculate sensor calibration values for sensor frequency bins operating on SLE and MCAEC outputs. A noise reduction filter engine (NRE) 9 is configured to subtract noise signals from the BFE output. An inverse transform engine (ITE) 10 is configured to generate time-domain data from the NRE output. One or more output ports 1C are configured to output the time-domain data to receiver 102 (FIG. 1A).

Figure 2:
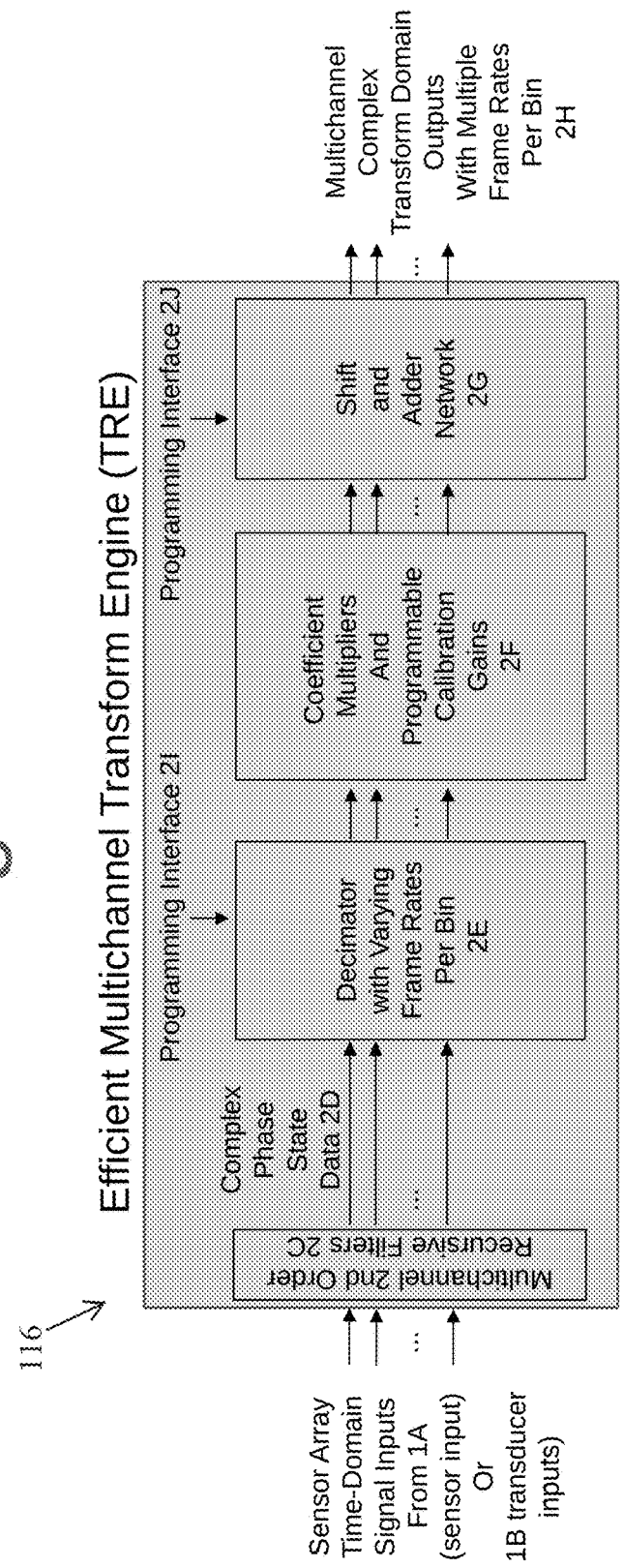
FIG. 2 is a functional block diagram of a component used in embodiments of the present invention.

Specific modules within the processor 110 will be described below with reference to FIGS. 2-11. Referring now to FIG. 2, a multichannel transform engine 116 is used in both the TTE 2B and STE 2A to convert multiple channels of digital time domain inputs into vectors of data called "transform domain vectors" with each vector including a set of "transform domain bins". Each bin is a complex data value representing the phase and magnitude component of a specific frequency F in a block of N time-domain inputs, with N being defined as the block size for a given bin. Each bin has an output frame rate R which is the ratio of the bin output rate relative to the input sample rate.

The engine 116 enables each frequency bin to have different N, F, and R independent of other bins. This enables use of various "non-uniform" transform configurations that use different frequency spacings, block sizes, and frame rates for different frequency bands of inputs. Such choices enable the sensor-array processor 110 to optimize performance and processing efficiency for specific frequency bands and for the overall application.

In one example of an efficient transform engine 116 using different non-uniform frequency bands, a first set of one or more engines calculates 80 transforms of an audio band of 100-8000 Hertz at a 100 Hertz frequency spacing, and a second set of one or more engines calculates 8 transforms of an ultrasonic band of 20500-24000 Hertz at a 500 Hertz frequency spacing. Such a configuration remains efficient with only 88 transform bin engines, but includes both audio capture and the ability to use ultrasonic frequencies to perform ranging, gesture recognition, occupancy detection, room sizing, reverberation characterization, and combinations thereof, etc. For further discussion herein, we use the term multi-band transform engine (multi-band TRE) to represent a TRE 116 with this type of configuration. Other examples of non-uniform frequency bands usable by the multi-band TRE include, but are not limited to, the first set of engines calculating transforms over a full audio band of about 10 Hz-12 KHz, with the second set calculating transforms over higher ultrasonic frequency bands such as from about 12 KHz-64 KHz up to 192 KHz-200 KHz or higher. In particular embodiments it may be advantageous to configure the second set of engines to calculate transforms within the low end of the ultrasonic frequency band, e.g., from about 12 KHz to 14 KHz. Since many conventional audio transducers (e.g., microphones) are operable in this range, such use would eliminate the need for specialized ultrasonic transducers.

We now describe the use of a multi-band TRE in particular embodiments for ranging, gesture recognition, occupancy detection, and room sizing or similar applications. Referring now to FIGS. 1B-2, one or more of the TREs 116 within the STE 2A and TTE 2B of the Integrated 3D Sensor-Array Processor may be configured as a multi-band TRE including one or more output playback channels. The output channels are connected to one or more output transducers such as a loudspeaker or a built-in ultrasonic transducer, or both. An example configuration includes a left and right channel for loudspeakers 104. It should be recognized that the loudspeakers 104 may be external as shown, or built-in to the various components shown and described herein. A range estimation software algorithm executed by processor 110 will generate ranging signals (described below) at the particular frequencies of the upper band of the multi-band TRE (e.g., 20500-24000 Hz in the above examples). These signals are outputted through one or more of the output transducers 104, 104', echo off walls and objects and are captured at input ports 1A and 1B where they are processed by the TRE. In particular, the ranging signals are recovered by the upper band of the TRE. The multi-band TRE will use conventional spatial filter and noise reduction approaches, etc. to focus listening on acoustic audio coming from a specific direction/location and estimate the echo path time (described below) of the acoustic path and thus estimate the range of the object or surface (if any) from that direction. The process can be repeated for other directions to form a 2D scan of ranges/distances in azimuth and elevation.

What we have defined as "ranging" signals for this discussion are generated for output by processor 110 via speakers 104 and have characteristics that enable good estimation of the time it took for an echo of that signal to arrive and be captured at inputs 1A, 1B (the echo path time). Example ranging signals include, but are not limited to quadrature amplitude modulated (QAM) signals modulated by spectrum-spreading binary sequences such as Gold Codes, Kasami Codes, Walsh Codes etc. Such a modulated QAM signal can be set to specific frequency bins of the upper band TRE and thus any acoustic echos of these signals are presented as signal energy data in that specific frequency bin of the TRE output which make the decoding process relatively efficient as the TRE is effectively performing the demodulation of the QAM signal.

In particular embodiments, the estimation of the echo path time is done by estimating the delay of the received signal with the generated signal sent to the output. A common example includes, but is not limited to, using cross-correlation to estimate the shift between the signals.

We now highlight a few potential benefits of integrated ranging using the multi-band TRE example above. One potential benefit is the efficiency of implementation by a good design of both ranging signals and the TRE band with particular frequency bins and bandwidth of each bin. This provides efficiency by reducing the computation required for ranging, since no transform or demodulation outside of the TRE is required, while enabling higher performance with ability to use the spatial filtering and noise reduction to improve the ranging signal echo reception. Another benefit is that in particular embodiments, this approach allows ranging to operate simultaneously with voice or sound capture in the audio band. Moreover, these approaches may provide system-level cost reduction by using the acoustic sensor array for both voice and non-voice sound interface and occupancy detection or gesture recognition, as it can eliminate adding optical sensors or a camera.

Embodiments of TRE 116, with or without being configured as the afore-mentioned multi-band TRE, use a $2^{nd}$ order recursive filter 2C that calculates the input correlation with a sinusoid waveform of a specific frequency F over the past N time samples. The correlation is a measure of the energy of that frequency in the sensor inputs 1A (e.g., from sensors 108, FIG. 1A) or transducer inputs 1B (e.g., provided by receiver 102 to transducers 104). The output for each bin are two values from the filter state which reflect the current phase and amplitude of the correlation. Every sample update calculates a valid output over the past N samples. A decimator 2E that picks every R samples from the output will thus enable a frame rate R of a transform bin at F and block size N. This approach is both flexible and efficient in two ways:

1. Filters can be designed that use only a single real multiply per sample for each bin. When choosing a non-uniform frequency spacing and a small subset of frequencies of the input spectrum, this approach can be significantly more efficient than calculating an entire block transform of N bins.
2. For high frame rates and large block sizes: a recursive calculation for R samples (i.e. R*#bins multiplies) is more efficient than calculating an entirely new block transform every R samples (i.e. N*log(N)*N/R multiplies).

After decimation, the filter state values need phase adjustment and scaling to improve reconstruction provided later by inverse transform engine (ITE 10, FIG. 1B). This is done by the coefficient multiplier engine 2F, in which each bin gets multiplied by complex or real coefficient values. Calibration gains are integrated into this stage, either by adding these values in the coefficients, or integrating a separate calibration offset operation into operations.

A shift and adder network 2G then effectively applies a shift and window to the transform vector, to generate Multichannel Complex Transform Domain Outputs 2H as shown.

Turning now to FIG. 3, the Spatial Filtering Engine (SFE) 3 processes multichannel transform vectors (i.e., outputs) 2H from the STE 2A (FIG. 1B) and provides a single filter output transform vector 3B. Each bin in each channel is filtered using the filter coefficients that are either built-in to the block, or configured through the programming interface. The filter coefficients are designed to amplify a target signal located at a 3D location from the sensors. The SFE 3 coefficients are also designed to attenuate signals from other locations that may interfere with the target signal.

The SFE 3 can operate on transform data bins that have different frame rates. For each bin, it processes at the input rate, and outputs results at the same rate.

The SFE 3 integrates decorrelation filters for 3D locations that are considered transducer echo sources. This enables downstream echo cancellation (the MCAEC 8) to work more effectively when there are multiple playback transducer channels that have high correlation.

The SFE 3 filter can use subfilters to increase the filtering capability. For example, a transform with 32 bins typically requires 1 set of 32 coefficients. Adding subfilters increases the number of filter sets, for example 2 sets of 32 coefficients. This increases the filtering performance with more computational cost.

Turning now to FIG. 4, the blocking filter engine (BFE) 4 processes multichannel transform vectors from the STE 2A (FIG. 1B) and provides multiple filter outputs of transform vectors 4B. Each bin in each channel is filtered using the filter coefficients provided by the EME 7 (FIG. 1B). These filter coefficients are designed to remove the source target signal such that the output has little or no target signal energy.

As shown in FIG. 5A, the 3D source localization engine (SLE) 5 processes multichannel transform vectors from the STE 2A (FIG. 1B) and outputs to the EME 7 (FIG. 1B), a vector of target presence probabilities 5B and four-dimensional data vectors with 3D location 5C and power, i.e. azimuth, elevation, distance, and power of currently active targets. The estimates can be calculated using a choice of algorithms such as the well-known MUSIC and ESPRIT algorithms, (or the Siemens LMS Test Lab commercially available from Siemens USA (http://wwww.lmsintl.com/sound-source-localization) modified for near-field 3D location estimation, or using well-known statistical learning algorithms like clustering, bayesian filtering or a neural network trained on the particular one, two, or three dimensional sensor array spacing configuration. Other approaches include a combination of instantaneous near-field or far-field algorithms like instantaneous DOA (direction-of-arrival), spherical interpolation, Steered Response Power (SRP) and time-delay estimators. Note that the aforementioned neural network may include any one or more of the well-known classes of neural algorithms, including but not limited to perceptrons, feedforward neural networks, deep neural networks (DNNs), recurrent neural networks (RNNs), long-term short-memory networks (LSTM)s, etc., trained using conventional network training methods.

The SLE 5 can accept transform data inputs at a higher frame rate than is required for its output. For example, if the transform inputs are at rate R, the SLE 5 can process and deliver outputs at slower rates R/2, R/4, etc. This faster input processing can lead to relatively better source detection and more accurate results. It is noted that as will be discussed in greater detail hereinbelow, using the proposed transform methodology to run SLE 5 at faster frame rates while keeping the filtering blocks (SFE 3, BFE 4, MCAEC 8, and NRE 9) at slower frame rates allows significant performance improvement while minimizing additional computational cost.

A choice of sensor clustering can also be made in the SLE 5 for trading off accuracy and implementation cost. A full sensor-pair configuration takes M*(M−1) sensor pairs which uses all sensor data differences for the best performance in some applications. A reduced sensor pair configuration might include sensor difference data between only adjacent sensors, requiring only M−1 sensor pairs. This may reduce computation but may also reduce the performance of detecting source locations in some applications.

Turning now to FIG. 6, the sensor calibration engine (SCE) 6 accepts multichannel transform domain data from sensor-array STE 2A (FIG. 1B) and accepts multiple target probabilities of known sources and far-field only sources from EME 7 (FIG. 1B). One or more of the target presence probabilities can be configured as "known" by providing location data or reference transform domain data values so the SCE 6 can compare and calculate calibration gains.

The SCE 6 calculates calibration gains 6B that are sent to STE 2A where they effectively get multiplied to sensor inputs to compensate for variations in the sensor sensitivity due to manufacturing tolerances, aging, or other effects that can impact non-ideal performance. The calibration gain can be calculated over time from multiple inputs using adaptive algorithms such as Kalman filter, recursive least-squares, or batch-mode algorithms such as least squares or convex optimization. Calibration data of the sensors is the main output used in these algorithms, but auxiliary microphone sensor health data can be optionally provided through the programming interface. This includes a history of sensor noise floor and sensitivity data. The first output is a vector of complex gain parameters for each microphone and frequency bin which are then applied to the input signals to compensate for the detected non-ideal behavior of each sensor. The SCE may include a programming interface 6I for output of sensor health, failure and alerts upon sensor failure and overload.

As shown in FIG. 7, the Environmental Modeling Engine (EME) 7 receives multichannel transform domain data from sensor-array STE 2A (FIG. 1B), and probabilities of target, noise, and interference presence and active target 3D locations from SLE 5 (FIG. 1B). From this it calculates current values of signal statistics such as the cross correlation matrix for the target signal, the overall noise signal, and one or more interference signals, which are sent to SCE 6 (FIG. 1B). The EME 7 also maintains an average of these statistics over time and updates the averages with the newly calculated values.

The target signal is defined as an active source located within a defined target zone in the 3D environment. An example target zone could be defined as a volume at +/−20 degrees around 0 degrees azimuth, 0 degrees elevation, and +/−1 m around 2 m distance. If an active source is detected within this zone, then the EME 7 will monitor it by updating the target signal statistics with an update weighted by its presence probability.

Interference signals are monitored as active sources that are not located in the target zone. As there could be multiple interference signals present, the EME 7 can consolidate the calculations into a single statistic. Optionally, the interference statistics can be broken out into multiple zones allowing for more visibility of interference sources but resulting higher computational costs.

Noise signals are also monitored with a noise statistic update when there is no active target. Detecting an active source can be done by a simple the energy threshold or using a more sophisticated Voice Activity Detection (VAD) algorithm.

The EME 7 uses the statistics to create the coefficient output for BFE 4. These filter coefficients are designed to eliminate the target signal energy from the sensor transform domain inputs provided to the EME by the STE.

The EME also calculates transducer 3D locations using the MCAEC 8 input power statistics and MCAEC filter coefficients inputs. One method to determine this is by calculating a normalized cross correlation of the transducer input power values with the power of active sources. If any of the correlations exceed a pre-defined threshold, then the correlated source indicates the transducer location. More sophisticated algorithms can incorporate the MCAEC coefficients to distinguish between the direct transducer location and its echo location in the case where the environment is a reverberant enclosure. Furthermore, algorithms can be applied here to estimate the reverberation time of the enclosure, and other enclosure characteristics such as size and volume. Such parameters are made available to external applications through the programming interface 7I.

Turning now to FIG. 8, the multichannel acoustic echo cancellation engine (MCAEC) 8 accepts a single channel of transform domain data input (SCI) from SFE 3 (FIG. 1B) and a multichannel transform domain data input (MCI), from SFE 3 and TTE 2B (FIG. 1B). The MCAEC cancels MCI signal components from the SCI and outputs this to a single channel transform domain output (SCO) 8B, to NRE 9 (FIG. 1B). The MCI inputs are transducer playback signals that reflect or bounce around in the environment and appear as echoes in the sensor signals. The SCI is assumed to have a desired target signal with a mixture of these playback interference signals. The MCAEC 8 operates on each input transform bin to remove this echo interference.

Adaptive learning algorithms are used to estimate filters that subtract the interference to create a clean desired target source signal on the output. The learning algorithms can be standard MMSE adaptive filters like Least-Mean Square (LMS), Normalized LMS, a Recursive Least Square (RLS) or Fast RLS that minimize the mean square error using the probability inputs to create the desired signal to be estimated. The filtering algorithms accept and can be optimized for different bin frame rates. For example, higher frame rates can lead to faster convergence and better estimation of cancellation filters yet require increase in computational resources. With the flexibility of the proposed transform methodology in FIG. 2, a system designer can pick transform parameters that optimize the tradeoff of cancellation performance versus computation cost.

The MCAEC also outputs power input power measurements of the MCI signals which are used in Environmental Monitoring Engine (EME) 7 (FIG. 1B) to detect locations of transducer playback, calculate reverberation times, enclosure size, etc.

Figure 9:
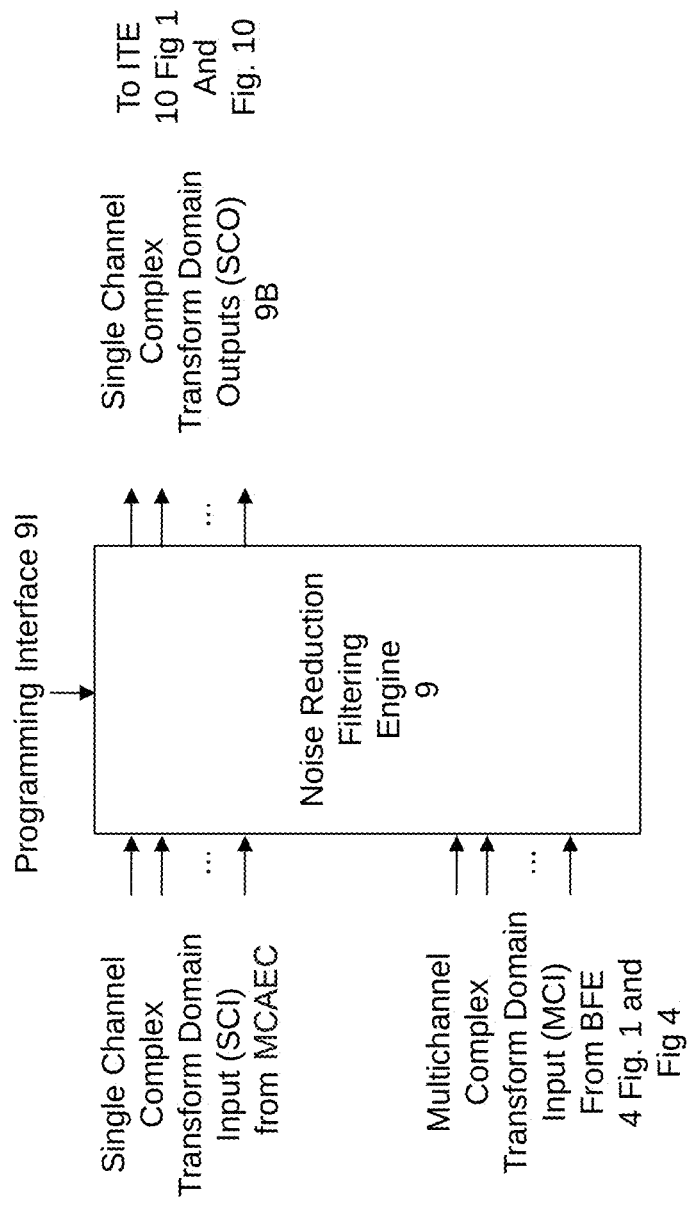
FIG. 9 is a functional block diagram of a component used in embodiments of the present invention.

Turning now to FIG. 9, the Noise Reduction Filtering engine (NRE) 9 accepts a single channel input of transform domain data (SCI) and a multichannel input of transform domain data (MCI) from MCAEC 8 and BFE 4, respectively. The NRE 9 subtracts MCI signal components from the SCI and outputs this to a single channel transform domain output (SCO) 9B, which is sent to ITE 10.

Similar to the MCAEC 8, adaptive learning algorithms are used to estimate filters that subtract the signal energy in the MCI from the SCI. The learning algorithms can be standard MMSE (minimum mean square error) adaptive filters like Least-Mean Square (LMS), Normalized LMS, a Recursive Least Square (RLS) or Fast RLS that minimize the mean square error using the probability inputs to create the desired signal to be estimated. The filtering algorithms accept and can be optimized for different bin frame rates. For example, higher frame rates can lead to faster convergence and better estimation of cancellation filters yet require increase in computational resources. With the flexibility of the proposed transform methodology in FIG. 2, a system designer can pick transform parameters that optimize the tradeoff of noise reduction performance versus computation cost.

Figure 10:
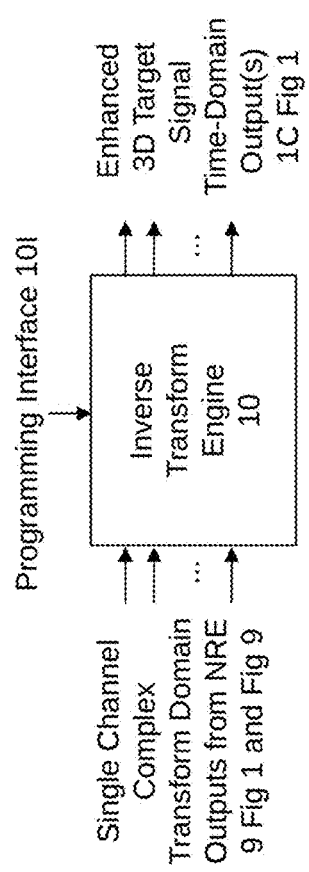
FIG. 10 is a functional block diagram of a component used in embodiments of the present invention.

Turning now to FIG. 10, the Inverse Transform Engine (ITE) 10 processes a single channel input of transform domain signals from the NRE 9 (FIG. 1B) and provides a single channel of time-domain samples as an output 1C. It applies an inverse transform algorithm using all the transform bins of the input and based on the transform engine parameters used in the STE 2A and TTE 10 (FIG. 1B).

Figure 11:
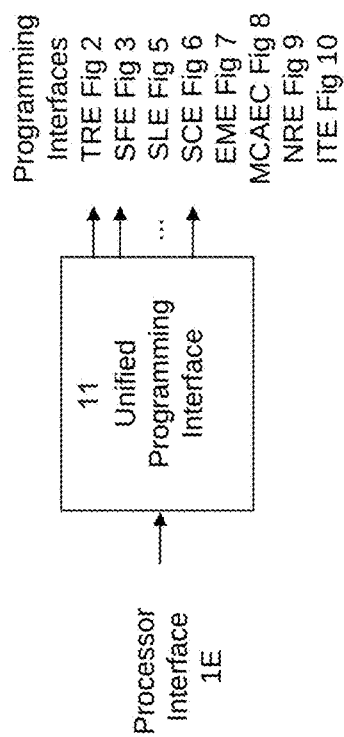
FIG. 11 is a functional block diagram of a component used in embodiments of the present invention.

As shown in FIG. 11, a unified programming interface 11 consolidates programming interfaces 2I, 2J, 3I, 5I, 6I, 7I, 8I, 9I and 10I (FIGS. 2-10) of blocks in the Processor 110 (FIG. 1B) to enable external CPU and software to access and configure the internal blocks via a single processor/programmer interface 1E.

Figure 5B:
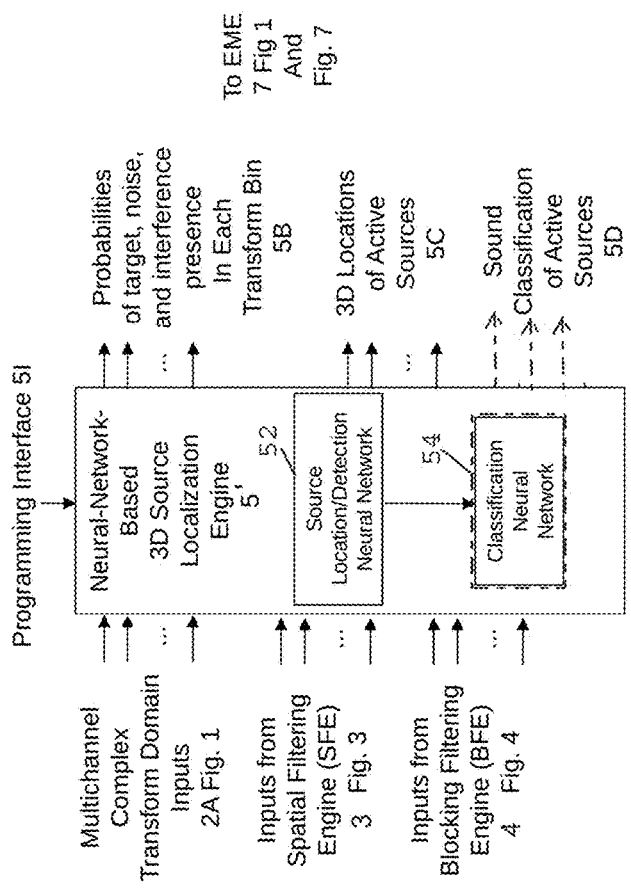
FIG. 5B is a functional block diagram of a component used in alternate embodiments of the present invention.

Turning now to FIG. 5B, alternate embodiments of the present invention are substantially as shown and described hereinabove, but for modifying the aforementioned neural network based SLE to receive inputs directly from STE 2A, SFE 3, and/or BFE 4, and as further described hereinbelow. This modified SLE is shown at 5' in FIG. 5B (and in FIGS. 1B and 1D), and the additional direct inputs (beyond those from STE 2A) from SFE 3 and BFE 4 are shown in phantom in FIG. 1B. These inputs may be used by SLE 5' in substantially any combination, by a source location/detection neural network 52, and optionally, by a classification neural network 54 shown in phantom. Neural network 52 uses inputs that include any combination of the inputs from STE 2A, SFE 3 and/or BFE 4. It should be noted that the ability to use SFE and BFE inputs can enhance detection sensitivity and accuracy while reducing neural network size and depth, as this additional input data can reduce the model size using conventional network training methods. For any given input, the network can use direct complex data transform vectors, or alternately calculate phase, amplitude, or both phase and amplitude for the input calculations to generate the vector of target presence probabilities 5B and the four-dimensional data vectors with 3D location as shown at 5C. In particular embodiments, these outputs 5B and 5C are then forwarded to other components, e.g., the Environmental Monitoring Engine (EME) 7 (FIG. 1B and FIG. 7), for further processing as described hereinabove.

In the aforementioned optional variation of these embodiments, optional classification neural network 54 uses a sound classification function to generate a sound classification output of active sources, shown in phantom at 5D. In this optional variation, in addition to generating outputs 5B and 5C, network 54 generates a sound classification output of active sources, shown in phantom at 5D, which is also forwarded to EME 7.

It should be noted that the neural networks 52, 54 may be jointly trained with source localization, or may be trained and used as a combination of separate networks focused on different classification or localization subfunctions that work together. For example, the classification neural network (sound classifier) 54 may be trained for a small or large dictionary of sound types, using spectral features, temporal features and/or both.

Use of the neural network 52 and optional network 54 may be expected to provide high performance and/or reduced network size and computational cost relative to alternative approaches in various applications. Moreover, the generation of sound classification output of active sources 5D has been shown to enable EME 7 to provide relatively high level classification and learning. Moreover, in particular embodiments, this high level classification information generated by EME 7, may be streamed over a network (e.g., Wi-Fi, Ethernet or Internet) to a higher performance computer such as a personal computer in the home or a data center computer in a remote location. This multi-level classification architecture uses more detailed sensor information locally, while streaming lower bandwidth local classification data over a network for higher performance, e.g., by enabling the use of relatively large dictionary sound classification, providing automatic speech recognition, and providing for human speaker identification.

Turning now to FIG. 1D, an exemplary configuration of the aforementioned embodiments shown and described with respect to FIG. 5B is described in greater detail. As shown, embodiments may include an STE 2A configured to create sensor transform data from the sensor signals and to apply sensor calibration adjustments, and a transducer output transform engine (TTE) configured to generate transducer output transform data from the transducer signals. The STE and TTE are each being configured to respectively create the sensor transform data and transducer output transform data by use of a multichannel transform engine that converts multiple channels of digital inputs into vectors of data with each vector including a set of transform domain bins representing non-uniform frequency spacing and a non-uniform time sampling output frame rate R, and in which each bin is a complex data value representing a phase and magnitude component of a bin center frequency F in a block of N samples. A spatial filter engine (SFE) is configured to apply one or more sets of suppression coefficients to the sensor transform data, to suppress target signals received from noise locations and/or amplification locations. A source localization engine (SLE) is configured to estimate active source locations in a 3D sensor field of each subband in each frame of the sensor transform data outputted by the STE, the SLE including a neural network. An inverse transform engine (ITE) is configured to generate time-domain data from the sensor transform data; and one or more output ports configured to output the time-domain data.

In a variation of this embodiment, the SLE is configured to receive SFE output, and to use the SFE output in said neural network. As a further variation, as shown in phantom, a blocking filter engine (BFE) is configured to apply one or more sets of subtraction coefficients to the sensor transform data, to subtract the target signals from the sensor transform data. Moreover, in particular variations, the SLE is configured to receive BFE output, and to use the BFE output in said neural network.

As also described hereinabove, the neural network of these embodiments may include a source location algorithm 52 (FIG. 5B) to estimate active source locations in a 3D sensor field of each subband in each frame of the sensor transform data outputted by the STE. The neural network may also include a classification algorithm 54 (FIG. 5B) configured to generate a sound classification output of active sources of the sensor transform data outputted by the STE.

These embodiments may further include any of the aspects shown and described herein with respect to FIG. 1B or any of the other embodiments described herein.

Referring now to FIG. 1C, an alternate embodiment is shown as processor 110', which is substantially similar to processor 110, while omitting the SLE 5, SCE 6 EME 7 and MCAEC 8. As shown, processor 110' includes a plurality of sensor array time-domain input ports 1A configured to receive sensor signals from a plurality of time-domain sensors. A sensor transform engine (STE) 2A is configured to create sensor transform data from the sensor signals and to apply sensor calibration adjustments. A plurality of transducer time-domain input ports 1B are configured to receive a plurality of time-domain transducer signals. A transducer output transform engine (TTE) 2B is configured to generate transducer output transform data from the transducer signals. A spatial filter engine (SFE) 3 is configured to apply one or more sets of suppression coefficients to the sensor transform data, to suppress target signals received from noise locations and/or amplification locations. A blocking filter engine (BFE) 4 is configured to apply one or more sets of subtraction coefficients to the sensor transform data, to subtract the target signals from the sensor transform data. A noise reduction filter engine (NRE) 9 is configured to subtract noise signals from the BFE output. An inverse transform engine (ITE) 10 is configured to generate time-domain data from the NRE output. One or more output ports 1C are configured to output the time-domain data.

The foregoing embodiments thus provide for efficient and flexible transforms that allow use of non-uniform frequency spacing and frame rates across the frequency bins. For example, the STE and TTE may use non-uniform frequency spacing, while the SFE, BFE, SLE, SCE and NREs may all operate at frame rates that are reduced relative to their inputs. These embodiments also advantageously reduce the computation cost of implementation in FPGA hardware, ASIC hardware, embedded DSP firmware, and/or in software, and when higher frame rates and non-uniform frequency spacings are used. For example, using the proposed transform engine method, high frequencies can be processed using wider frequency spacings (lower resolution), thus requiring less bins and computation, while lower frequencies can be processed using smaller spacings (higher resolution and computation). Furthermore, frame rates can be adjusted individually to allow lower frequency bins to process relatively faster (higher oversampling) for lower latency and better performance, while simultaneously allowing higher frequencies to use lower relative frame rates (less oversampling). This enables flexibility to tune the resolution using higher or lower frequency spacings where needed. This also leads to a sensor array processing solution with relatively low latency while maintaining advantages of transform domain processing. Resulting transform-domain processing efficiency improvements enable other processing to be integrated more closely with the filtering to enhance performance while maintaining relatively low system latency.

It should also be recognized that although various embodiments contemplate the receipt and use of inputs from time-domain sensors, other types of sensors, such as frequency-domain sensors, may also be used without departing from the scope of the present invention. Indeed, the person skilled in the art will recognize that the STE and TTE described hereinabove, including their use of transform domain bins representing non-uniform frequency spacing and a non-uniform time sampling output frame rate, contemplate the use of both time-domain and frequency-domain inputs.

Embodiments of the present invention include a computer program code-based product, which includes a computer readable storage medium having program code stored therein which can be used to instruct a computer to perform any of the functions, methods and/or modules associated with the present invention. The non-transitory computer readable medium includes any of, but not limited to, the following: CD-ROM, DVD, magnetic tape, optical disc, hard drive, floppy disk, ferroelectric memory, flash memory, phase-change memory, ferromagnetic memory, optical storage, charge coupled devices, magnetic or optical cards, smart cards, EEPROM, EPROM, RAM, ROM, DRAM, SRAM, SDRAM, and/or any other appropriate static, dynamic, or volatile memory or data storage devices, but does not include a transitory signal per se. The programming of the present invention may be implemented by one skilled in the art of computer systems and/or software design.

In the preceding specification, the invention has been described with reference to specific exemplary embodiments for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

It should be further understood that any of the features described with respect to one of the embodiments described herein may be similarly applied to any of the other embodiments described herein without departing from the scope of the present invention.

Having thus described the invention, what is claimed is:

1. An integrated sensor-array processor, comprising:
a plurality of sensor array input ports configured to receive sensor signals from a plurality of sensors;
a sensor transform engine (STE) configured to create sensor transform data from the sensor signals and to apply sensor calibration adjustments;
a plurality of transducer input ports configured to receive a plurality of transducer signals;
a transducer output transform engine (TTE) configured to generate transducer output transform data from the transducer signals;
the STE and TTE each being configured to respectively create the sensor transform data and transducer output transform data by use of a multichannel transform engine that converts multiple channels of digital inputs into vectors of data with each vector including a set of transform domain bins representing non-uniform frequency spacing and a non-uniform time sampling output frame rate R, and in which each bin is a complex data value representing a phase and magnitude component of a bin center frequency F in a block of N samples, wherein the non-uniform frequency spacing comprises an audio band within a range of about 10 Hz to 12 KHz, and an ultrasonic band within a range of about 12-64 KHz up to about 192-200 KHz, and the multichannel transform engine calculates a plurality of audio transforms at spaced intervals within the audio band, and calculates a plurality of ultrasonic transforms at spaced intervals within the ultrasonic band;
a spatial filter engine (SFE) configured to apply one or more sets of suppression coefficients to the sensor transform data, to suppress target signals received from noise locations and/or amplification locations;
a source localization engine (SLE) configured to estimate active source locations in a 3D sensor field of subbands in frames of the sensor transform data outputted by the STE, the SLE including a neural network;
an inverse transform engine (ITE) configured to generate time-domain data from the sensor transform data; and
one or more output ports configured to output the time-domain data.

2. The processor of claim 1, wherein the SLE is configured to receive SFE output, and to use the SFE output in said neural network.

3. The processor of claim 2, further comprising a blocking filter engine (BFE) configured to apply one or more sets of subtraction coefficients to the sensor transform data, to subtract the target signals from the sensor transform data.

4. The processor of claim 3, wherein the SLE is further configured to receive BFE output, and to use the BFE output in said neural network.

5. The processor of claim 4, wherein the neural network comprises a source location algorithm to estimate active source locations in a 3D sensor field of subbands in frames of the sensor transform data outputted by the STE.

6. The processor of claim 5, wherein the neural network comprises a classification algorithm configured to generate a sound classification output of active sources of the sensor transform data outputted by the STE.

7. The processor of claim 1, further comprising a noise reduction filter engine (NRE) configured to subtract noise signals from the sensor transform data before sending the sensor transform data to the ITE.

8. The processor of claim 1, wherein the sensor array input ports comprise time-domain input ports configured to receive sensor signals from a plurality of time-domain sensors.

9. The processor of claim 1, wherein the plurality of transducer input ports comprise time-domain input ports configured to receive a plurality of time-domain transducer signals.

10. The processor of claim 7, further comprising a multichannel acoustic-echo cancellation engine (MCAEC) configured to subtract transducer signals from SFE output, and the TTE output, and wherein the NRE is configured to subtract noise signals from the MCAEC output.

11. The processor of claim 10, further comprising an environmental modeling engine (EME) configured to process MCAEC outputs to characterize active sources as transducer or non-transducer, calculate enclosure characteristics, and calculate blocking filter BFE coefficients.

12. The processor of claim 11, further comprising a sensor calibration engine (SCE) configured to calculate sensor calibration values for MCAEC outputs.

13. The processor of claim 8, wherein the sensor array time-domain inputs are configured to receive signals from time-domain sensors including microphones or hydrophones.

14. The processor of claim 3, wherein the BFE is configured to calculate coefficients using current source location transform data from the SLE.

15. The processor of claim 13 wherein the sensor array time-domain inputs are configured to receive signals from time-domain sensors having uniform linear spacing.

16. The processor of claim 13 wherein the sensor array time-domain inputs are configured to receive signals from time-domain sensors having non-uniform spacing including octave, logarithmic, circular, spherical, or random spacing.

17. The processor of claim 8 wherein the sensor array time-domain inputs are configured to receive signals from time-domain sensors spaced in 1-dimension, 2-dimensions, or 3-dimensions.

18. The processor of claim 1, configured to use the plurality of ultrasonic transforms for non-audio applications selected from the group consisting of ranging, gesture recognition, occupancy detection, room sizing, reverberation characterization, and combinations thereof.

19. The processor of claim 1, configured to use uniform frequency spacing.

20. The processor of claim 1, configured to use a plurality of microphone sensor array components, transform components, source localization components, and multichannel echo cancellation components, for processing local speech data and playing audio to multiple speakers.

21. The processor of claim 20, configured to provide audio output to an audio speaker configuration including integrated stereo playback in a mobile phone, computer, tablet or similar portable device.

22. The processor of claim 20, configured to provide audio output to an audio speaker configuration including a surround-sound configuration connected to a home theater or amplifier.

23. The processor of claim 20, configured to provide audio output to an audio speaker configuration including a single channel speaker configuration connected to a home theater or amplifier.

24. The processor of claim 12 where the SCE is configured to integrate sensor calibration into one or more stages of transform processing.

25. The processor of claim 12, wherein the SCE is configured to use source location probabilities in the sensor calibration.

26. The processor of claim 11, wherein the SLE and EME are configured to use frame processing 2×, 3×, 4× or some fractional or integer multiple faster than the SFE, BFE, MCAEC, and NRE.

27. The processor of claim 1, wherein the STE and the TTE are configured to operate with non-uniform center frequencies.

28. The processor of claim 3, wherein the SFE and BFE are configured to operate at frames rates that are reduced relative to frame rates of their inputs.

29. The processor of claim 1, wherein the SLE is configured to operate at frames rates that are reduced relative to frame rates of its inputs.

30. The processor of claim 12, wherein the SCE is configured to operate at frames rates that are reduced relative to frame rates of its inputs.

31. An integrated sensor-array processor, comprising:
a plurality of sensor array input ports configured to receive sensor signals from a plurality of sensors;
a sensor transform engine (STE) configured to create sensor transform data from the sensor signals and to apply sensor calibration adjustments;
a plurality of transducer input ports configured to receive a plurality of transducer signals;
a transducer output (TTE) transform engine configured to generate transducer output transform data from the transducer signals;
the STE and TTE each being configured to respectively create the sensor transform data and transducer output transform data by use of a multichannel transform engine that converts multiple channels of digital inputs into vectors of data with each vector including a set of transform domain bins representing non-uniform frequency spacing and a non-uniform time sampling output frame rate R, and in which each bin is a complex data value representing a phase and magnitude component of a bin center frequency F in a block of N samples, wherein the non-uniform frequency spacing comprises an audio band within a range of about 10 Hz to 20 KHz, and an ultrasonic band within a range of about 60-64 KHz up to about 192-200 KHz, and the multichannel transform engine calculates a plurality of audio transforms at spaced intervals within the audio band, and calculates a plurality of ultrasonic transforms at spaced intervals within the ultrasonic band;
a spatial filter engine (SFE) configured to apply one or more sets of suppression coefficients to the sensor transform data, to suppress target signals received from noise locations or amplifications locations;
a source localization engine (SLE) configured to estimate active source locations in a 3D sensor field of subbands in frames of the sensor transform data outputted by the STE, the SLE including a neural network;
a multichannel acoustic-echo cancellation engine (ME-AEC) configured to subtract transducer signals from SFE output and the TTE output;
an environmental modeling engine (EME) configured to process SLE outputs and MCAEC outputs to characterize active sources as transducer or non-transducer, calculate enclosure characteristics, calculate BFE coefficients, and SCE values; and
a sensor calibration engine (SCE) configured to use the sensor transform data to calculate sensor calibration values for sensor frequency bins operating on SLE and MCAEC outputs;
a noise reduction filter engine (NRE) configured to subtract noise signals from the sensor transform data;
an inverse transform engine (ITE) configured to generate time-domain data from a NRE output; and
one or more output ports configured to output the time-domain data;
wherein the SLE is configured to receive SFE output, and to use the SFE output in said neural network.

32. The processor of claim 31, further comprising a blocking filter engine (BFE) configured to apply one or more sets of subtraction coefficients to the sensor transform data, to subtract the target signals from the sensor transform data, wherein the NRE is configured to subtract noise signals from a BFE output, wherein the SLE is further configured to receive BFE output, and to use the BFE output in said neural network.

33. The processor of claim 31, wherein the sensor array input ports comprise time-domain input ports configured to receive sensor signals from a plurality of time-domain sensors.

34. The processor of claim 31, wherein the plurality of transducer input ports comprise time-domain input ports configured to receive a plurality of time-domain transducer signals.

35. A method of integrated sensor-array processing, the method comprising:
  (a) creating, at a sensor transform engine (STE), sensor transform data from sensor signals and applying sensor calibration adjustments, the STE being configured to create the sensor transform data by use of a multichannel transform engine that converts multiple channels of digital inputs into vectors of data with each vector including a set of transform domain bins representing non-uniform frequency spacing and a non-uniform time sampling output frame rate R, and in which each bin is a complex data value representing a phase and magnitude component of a bin center frequency F in a block of N samples;
  (b) generating, at a transducer output transform engine (TTE), transducer output transform data from transducer signals, the TTE being configured to create the transducer output transform data by use of a multichannel transform engine that converts multiple channels of digital inputs into vectors of data with each vector including a set of transform domain bins representing non-uniform frequency spacing and a non-uniform time sampling output frame rate R, and in which each bin is a complex data value representing a phase and magnitude component of a bin center frequency F in a block of N samples, wherein the non-uniform frequency spacing comprises an audio band within a range of about 10 Hz to 20 KHz, and an ultrasonic band within a range of about 60-64 KHz up to about 192-200 KHz, and the multichannel transform engine calculates a plurality of audio transforms at spaced intervals within the audio band, and calculates a plurality of ultrasonic transforms at spaced intervals within the ultrasonic band;
  (c) applying, at a spatial filter engine (SFE), one or more sets of suppression coefficients to the sensor transform data, to suppress target signals received from noise locations or amplifications locations;
  (d) estimating, with a source localization engine (SLE) including a neural network, active source locations in a 3D sensor field of each subband in each frame of the sensor transform data outputted by the STE;
  (e) generating, at an inverse transform engine (ITE), time-domain data from the sensor transform data; and
  (f) outputting, at one or more output ports, the time-domain data.

36. The method of claim 35, further comprising receiving, at the SLE, SFE output and using the SFE output in said neural network.

37. The method of claim 36, further comprising applying, at a blocking filter engine (BFE), one or more sets of subtraction coefficients to the sensor transform data, to subtract the target signals from the sensor transform data.

38. The method of claim 37, further comprising receiving, at the SLE, BFE output and using the BFE output in said neural network.

39. An article of manufacture comprising a non-transitory computer usable medium having a computer readable program code embodied therein for:
  (a) creating, at a sensor transform engine (STE), sensor transform data from sensor signals and to apply sensor calibration adjustments, the STE being configured to create the sensor transform data by use of a multichannel transform engine that converts multiple channels of digital inputs into vectors of data with each vector including a set of transform domain bins representing non-uniform frequency spacing and a non-uniform time sampling output frame rate R, and in which each bin is a complex data value representing a phase and magnitude component of a bin center frequency F in a block of N samples;
  (b) generating, at a transducer output transform engine (TTE), transducer output transform data from transducer signals, the TTE being configured to create the transducer output transform data by use of a multichannel transform engine that converts multiple channels of digital inputs into vectors of data with each vector including a set of transform domain bins representing non-uniform frequency spacing and a non-uniform time sampling output frame rate R, and in which each bin is a complex data value representing a phase and magnitude component of a bin center frequency F in a block of N samples, wherein the non-uniform frequency spacing comprises an audio band within a range of about 10 Hz to 20 KHz, and an ultrasonic band within a range of about 60-64 KHz up to about 192-200 KHz, and the multichannel transform engine calculates a plurality of audio transforms at spaced intervals within the audio band, and calculates a plurality of ultrasonic transforms at spaced intervals within the ultrasonic band;
  (c) applying, at a spatial filter engine (SFE), one or more sets of suppression coefficients to the sensor transform data, to suppress target signals received from noise locations or amplifications locations;
  (d) estimating, with a source localization engine (SLE) including a neural network, active source locations in a 3D sensor field of subbands in frames of the sensor transform data outputted by the STE;
  (e) generating, at an inverse transform engine (ITE), time-domain data from the sensor transform data; and
  (f) outputting, at one or more output ports, the time-domain data.

40. The article of manufacture of claim 39, wherein the non-transitory computer usable medium has a computer readable program code embodied therein for receiving, at the SLE, SFE output and using the SFE output in said neural network.

41. The article of manufacture of claim 40, wherein the non-transitory computer usable medium has a computer readable program code embodied therein for applying, at a blocking filter engine (BFE), one or more sets of subtraction coefficients to the sensor transform data, to subtract the target signals from the sensor transform data.

42. The article of manufacture of claim 41, wherein the non-transitory computer usable medium has a computer readable program code embodied therein for receiving, at the SLE, BFE output and using the BFE output in said neural network.

* * * * *